June 21, 1938.  P. P. FRAZER  2,121,562
BOILER
Filed July 26, 1937  5 Sheets-Sheet 5

INVENTOR:
P. P. Frazer.
BY
ATTORNEY.

Patented June 21, 1938

2,121,562

UNITED STATES PATENT OFFICE 2,121,562

BOILER

Pinkney P. Frazer, Memphis, Tenn., assignor of one-half to Oliver E. Frazer, Hermondale, Mo.

Application July 26, 1937, Serial No. 155,753

4 Claims. (Cl. 122—316)

The present invention relates to boilers and pertains particularly to boilers of the water tube type.

The object of the present invention is to provide a compact water tube boiler with means to increase circulation of water and steam through the tubes when the tubes are heated.

Other objects of the invention are to provide a structure aforementioned which will be comparatively simple in construction, strong, durable, very highly efficient and reliable in use, compact, and, which may be manufactured at a reasonable cost.

All of the foregoing and still further objects of the invention will become apparent from a study of the following specification, taken in connection with the accompanying drawings, wherein like characters of reference denote similar parts throughout the several views, and wherein.

Briefly, in carrying out the invention, I employ one, or a battery of water tube units, or sections, a casing, open at its bottom, including an insulated jacket, a reservoir serving with the jacket to form the rear wall of the casing, the interior of the casing in which the units are disposed serving as a combustion chamber, a burner for each unit, and a draft diverter, or hood.

More particularly, one embodiment of the invention comprises one, or a battery of vertically disposed manifolds, a series of vertically spaced horizontally disposed tubes and a metal strip like element for dividing each tube longitudinally into a flow passage and a return passage.

More specifically, this embodiment of the invention comprises one, or a battery of suitably connected manifolds 1. Each manifold is vertically disposed and is provided with a plurality of vertically spaced shelves 2 integral with and projecting rearwardly therefrom a suitable distance toward the rear wall of each manifold employed to provide a plurality of vertically spaced pockets, or chambers 3.

Figure 1:
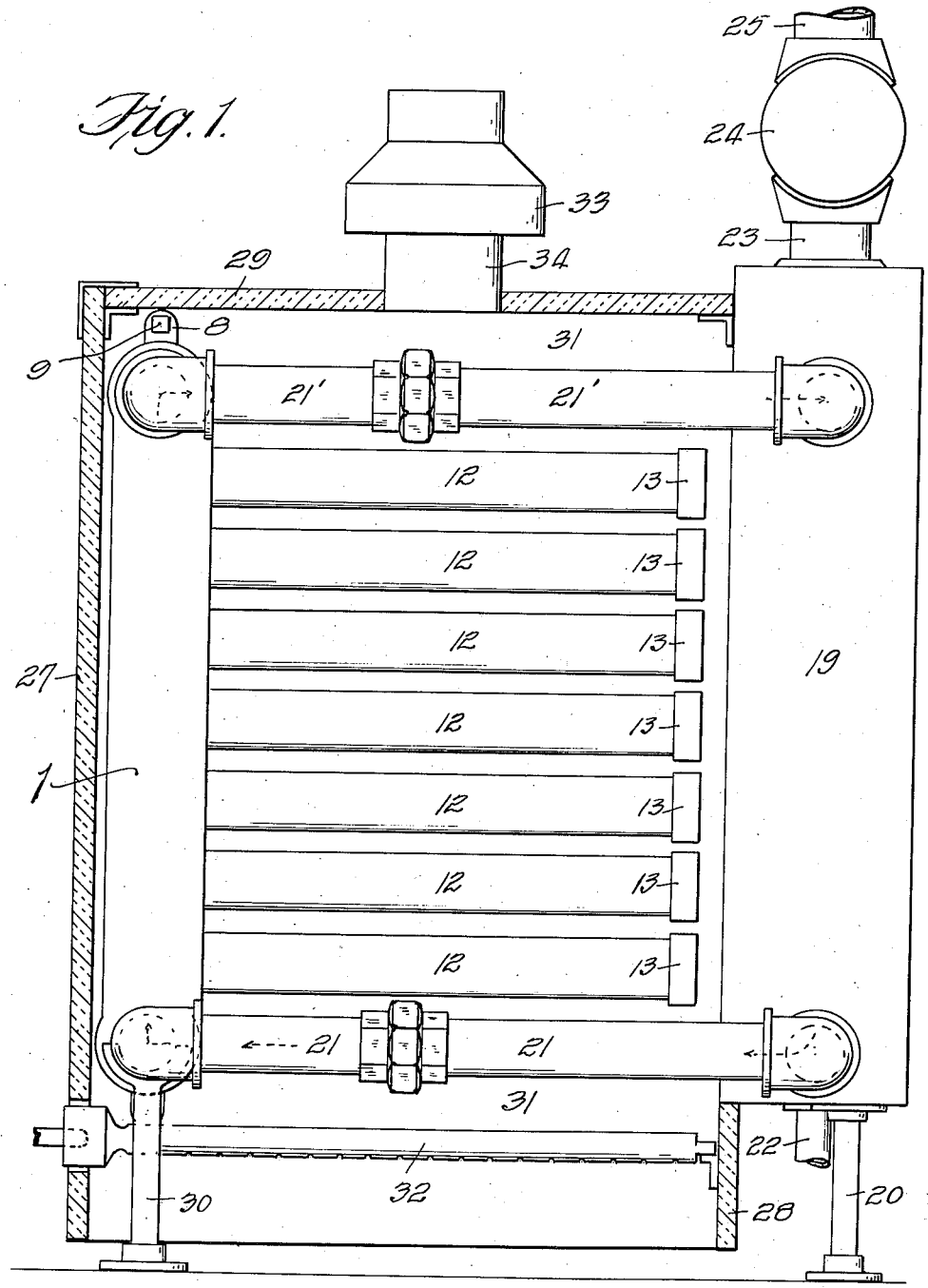
Fig. 1 is a side elevation of a boiler embodying the features of my invention, the side thereof being removed to show the interior parts, or water tube unit.
Figure 2:
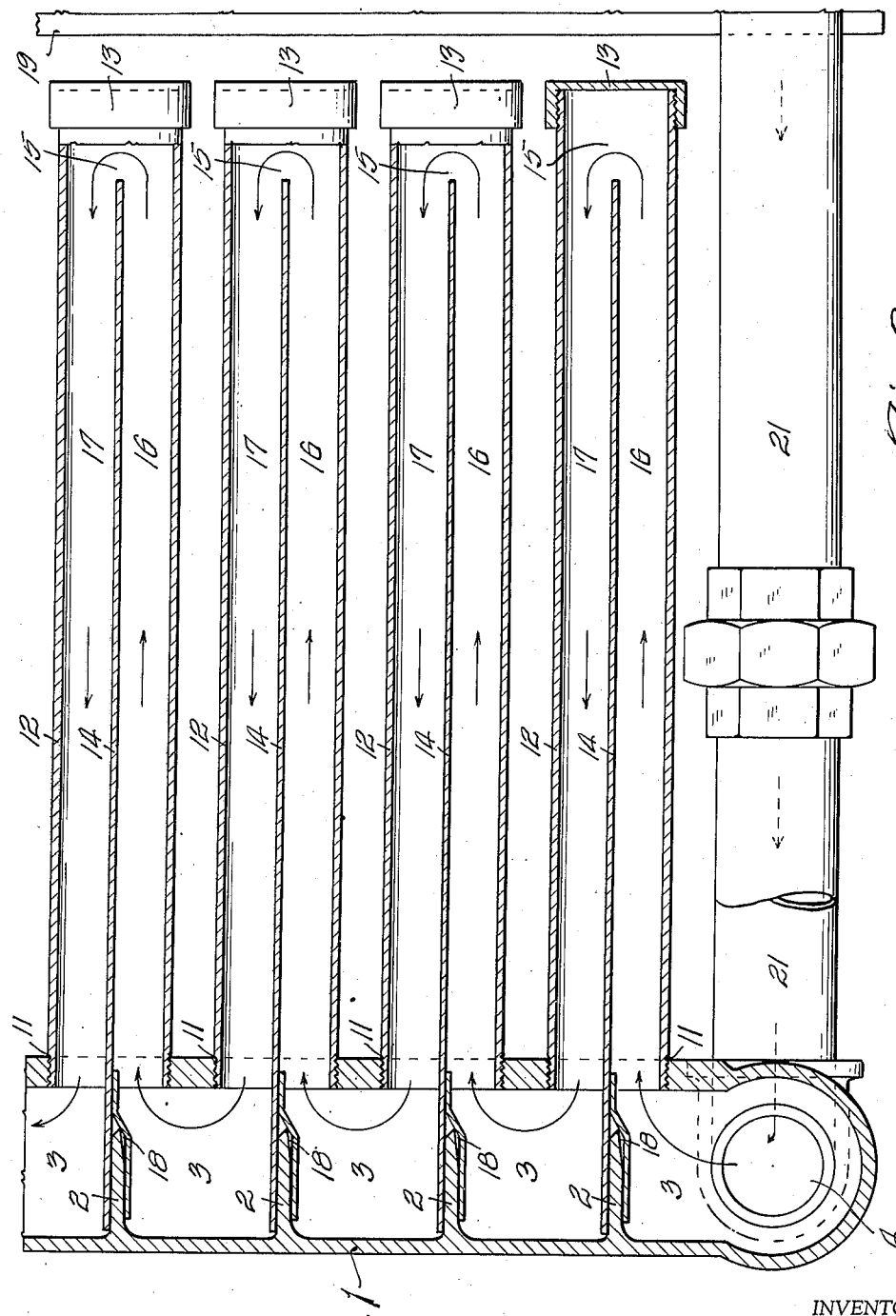
Fig. 2 is a longitudinal sectional view of a water tube unit, or heat transfer device, in which is shown a manifold and tubes constructed in accordance with my invention, and the same being shown as connected with the reservoir.
Figure 3:
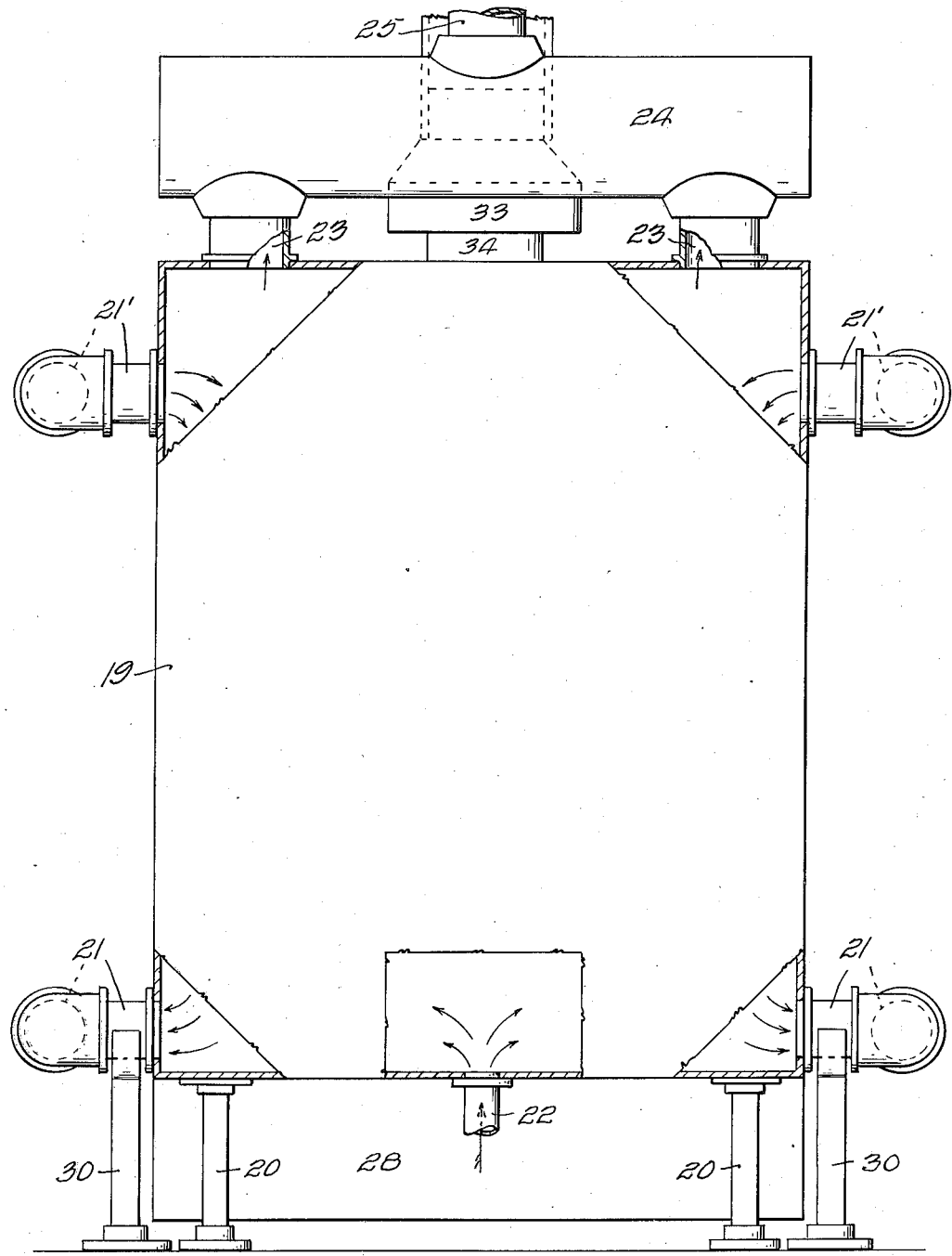
Fig. 3 is a rear elevation of the invention showing portions thereof as broken away.
Figure 4:
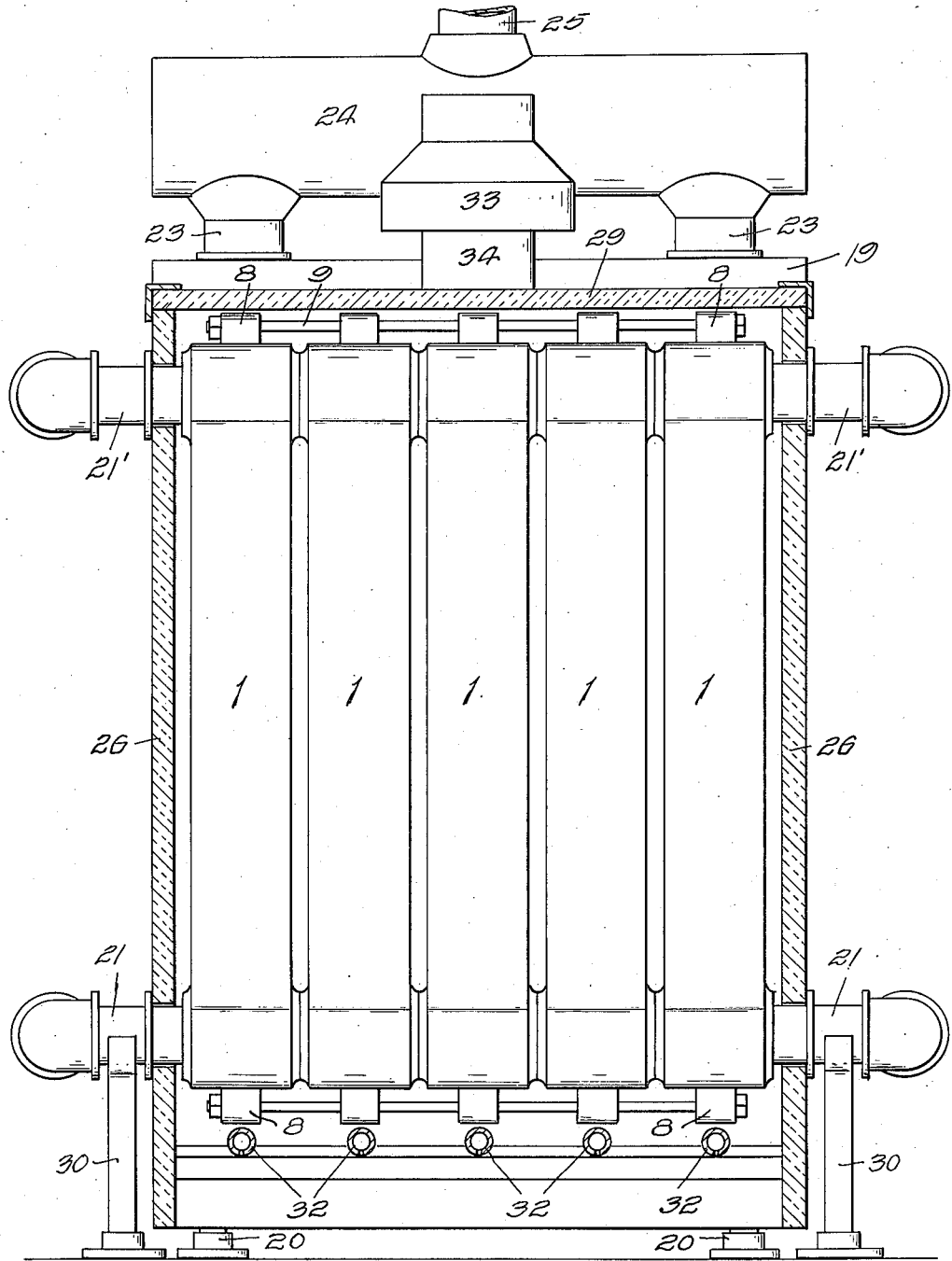
Fig. 4 is a front elevation of the boiler, the front wall of the jacket being removed to show the manifolds, which support the water tubes.
Figure 5:
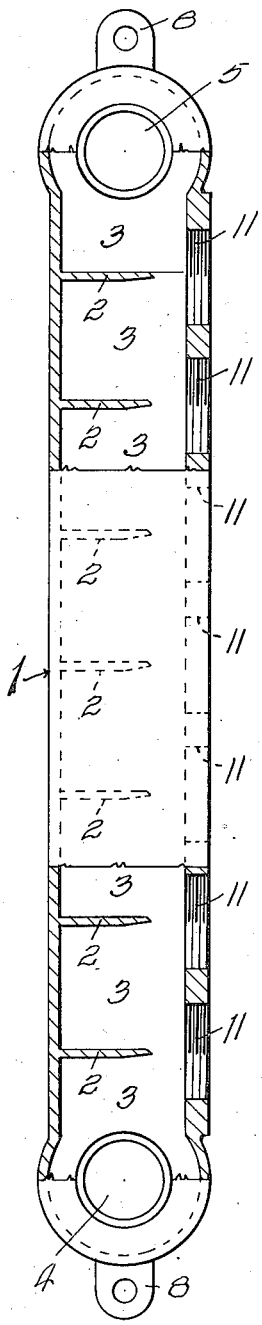
Fig. 5 is a view partly in side elevation and partly in section of one of the manifolds.
Figure 6:
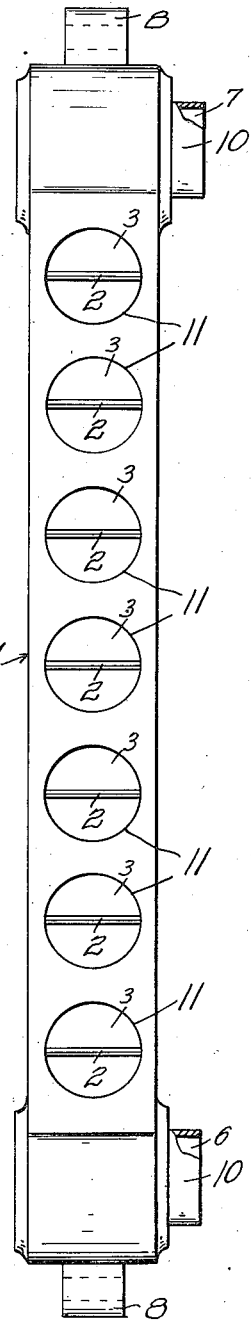
Fig. 6 is a rear elevation of the manifold.
Figure 7:
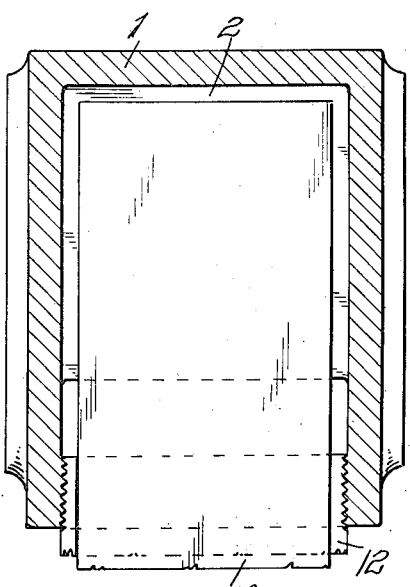
Fig. 7 is a cross-sectional view of one of the tubes and its dividing strip.
Figure 8:
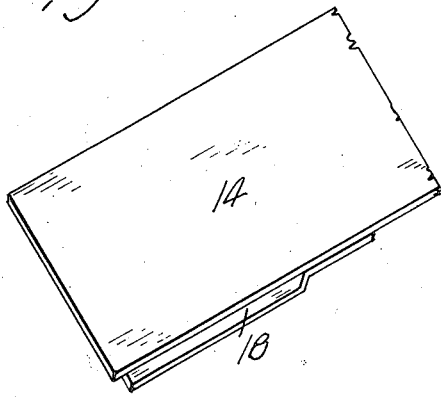
Fig. 8 is a fragmentary view in perspective of one of the tube dividing strips.

Each manifold 1 is provided with a suitable inlet opening 4, at its lower end, which is in communication with the lowermost manifold pocket 3, and a suitable outlet opening 5 in communication with the uppermost manifold pocket 3. When the units are arranged in battery formation, that is connected in side by side relation as shown in Fig. 4, the lower pockets 3 of adjacent units are all connected through suitable passages 6 and the upper pockets 3 are connected through suitable passages 7 as will be understood from Fig. 6. The end manifolds are each provided with suitable apertured ears 8, at the upper and lower ends thereof, and they are connected by suitable tie-rods 9. Nipple connections 10 serve to provide proper connection between adjacent units. The rear wall of each manifold is provided with a series of vertically spaced screw threaded openings 11 opposite the free ends of the manifold shelves 3.

A plurality of vertically spaced, horizontally disposed, preferably, although not necessarily, copper tubes 12 have connection, at one end, with the rear wall of each through screw threaded connection with the manifold openings 11. The tubes 12 are of any desired length and diameter and their opposite ends are each provided with suitable, preferably screw-threaded cap closures 13.

Associated with each tube 12, and each manifold shelf, is a tube dividing element 14. The element 14 is in the form of a flat strip-like metal member, preferably of copper, having a width equal to the interior diameter of the tube 12 and of a length extending from the manifold shelf to a suitable point short of the capped end of the tube, so as to provide a communicating space 15 at the capped end of the tube connecting a flow passage 16 formed in the lower half of the tube below the strip 14 and a return passage 17 formed in the upper half of the tube above the strip 14. The flow and return passages, it will be apparent are semi-spherical in cross-section, while the communicating space 15 therefor is cylindrical. The strips 14 for the tubes 12 are supported at their forward ends by the manifold shelves and in one embodiment thereof, the forward ends of the strips are provided with a suitable socket 18 so that the strips can be slipped on the shelf sufficiently secure to prevent longitudinal and rotary displacement of the strips relative to the tubes into which they project to divide the tube into the flow and return passages above described. The manifolds, tubes and the metal dividing strips are preferably made from high heat conducting materials.

A suitable vertically disposed reservoir 19 is arranged adjacent the capped end of the tubes 12 and supported by means of suitable legs 20. The reservoir 19 is connected with the battery of manifolds 1 by means of a pair of flow pipes 21, which connect the lower end of the reservoir with the lower end of the two outer manifolds, and the manifolds 1 are connected with the reservoir 19 by means of a pair of return pipes 27', which connect the upper ends of the manifolds 1 with the upper end of the reservoir, thus permitting a circulation of liquid, as indicated by the arrows. The reservoir is provided with a suitable liquid inlet 22. The reservoir is further provided with a plurality of suitable steam, water or vapor outlets 23 leading from the top thereof to a suitable steam drum 24 which is provided with a suitable outlet 25.

A suitable insulated jacket, including the side walls 26, the front wall 27, the rear wall 28 below the reservoir, and a top wall 29 serves with the reservoir to form a casing to house the tube units, or sections, with the reservoir serving to form the major portion of the rear wall thereof. The manifolds 1 are shown as supported by means of suitable legs 30.

The interior of the casing serves besides housing the tube units, as a combustion chamber 31 which is heated by means of suitable fuel burners 32, one below each tube unit, or section.

A boiler of the character herein described does not require excessive draft and the means employed to permit the necessary draft is in the nature of a draft hood or diverter designated 33, associated with a flue 34 in the top wall of the insulated jacket.

The water tube units, or sections, hereinbefore mentioned, are so shaped as is readily apparent, to present a maximum area of heating surface and to provide interconnected horizontal and vertically disposed heat travel within the combustion chamber.

Another important feature contributing to the high efficiency of the boiler herein described, includes the horizontally disposed U-shaped liquid flow and return passages within the tubes and manifold pockets, providing rapid liquid circulation to present a very high percentage of heating surface within the combustion chamber and permitting a large steam liberating area in the reservoir, when used for steam heating purposes.

It will be observed that the lowermost pockets in the manifolds communicate with flow passages of the lowermost tubes only, that the uppermost manifold pockets communicate with the return flow passage of the uppermost tubes only, and, that all of the intermediate manifold pockets are common to a flow and a return flow passage, with the flow passages communicating with the upper end of each intermediate pocket and the return passages communicating with the lower end of each pocket.

From the foregoing description, it is apparent that by having a flow passage and return passage within a single tubular heat transfer element, there is provided an increased flow contact area within the element or tube, augmenting thermal transfer, and increasing thermal activity in the heat absorbing liquid passing in a horizontal U-shaped course through the single tubular heat transfer element.

The many advantages of the herein described water tube units or sections, which can be used as a condenser, as well as a heat exchange, and the boiler as a whole, will readily present themselves to those skilled in the art to which the invention relates.

From the foregoing description, it is evident that a simple device for this purpose has been disclosed, but it is to be understood that I do not desire to restrict, or limit myself to the very details of the construction shown and described, which is merely illustrative, it being obvious that changes, not involving the exercise of invention, may be made without conflicting or departing from the spirit of the invention within the scope of the appended claims.

What I claim is:—

1. A boiler having, in combination, a casing, a reservoir having a liquid inlet forming one wall of the casing, a vertically disposed manifold within the casing adjacent the opposite wall of the casing, a plurality of horizontally disposed vertically aligned metal water tubes connected to and projecting from said manifold toward the reservoir, closures for the free ends of said tubes, shelves formed interiorly of the manifold, sheet metal strips of the width of the interior diameter of the tubes connected at one end to said shelves and dividing each tube into two liquid passages connected adjacent the closures on said tubes, and together with the shelves dividing the manifold into a plurality of vertically aligned water chambers, a tubular connection between the lower end of the reservoir and the lower end of the manifold, and a tubular connection between the upper end of the manifold and the upper end of the reservoir, and a steam or hot water outlet at the upper end of the reservoir.

2. In a water tube boiler, the combination of a vertically disposed reservoir, a plurality of vertically disposed manifolds arranged in side by side connected relation, a plurality of vertically spaced horizontally disposed water tubes connected at one end to each manifold and projecting toward the reservoir but spaced at the opposite ends therefrom, strip like members connected to each manifold and projecting into each tube to a point short of the free ends thereof, said strip like members dividing the tubes to provide a lower flow passage for each tube leading from the manifolds and a return flow passage from the free end of each tube back to the manifolds, a detachable cap for the free end of each tube, a pair of flow pipes leading from the lower end of the reservoir to the lower ends of the two outer manifolds, a return flow pipe leading from the upper ends of the two outer manifolds to the upper end of the reservoir, a liquid inlet to the bottom of the reservoir and a steam, vapor or water outlet at the upper end of the reservoir.

3. In a boiler structure, a reservoir having a liquid inlet and a steam or liquid outlet, a series of vertically disposed side by side connected manifolds, vertically spaced shelves within each manifold, horizontally disposed tubes connected at one end to the manifold adjacent the shelves, closures for the free ends of the tubes adjacent the reservoir, horizontally disposed flat metal elements clamped at one end to the manifold shelves and projecting into the tubes a distance short of the closures to provide a lower flow passage and an upper return flow passage in each tube connected adjacent the closures, a casing, and said reservoir forming the rear wall of the casing, water feed connections between the lower end of the reservoir and the lower ends of the two outermost manifolds, and return connections between the upper ends of said two outermost manifolds and the upper end of said reservoir.

4. A boiler structure including an open bottom casing, said casing comprising front, top and side walls and a reservoir having an inlet at its lower end and an outlet at its upper end forming the back of the casing, a plurality of series connected water tube units disposed within the casing, said units each consisting of a vertically disposed manifold positioned adjacent the front wall of the casing, return flow means connected to each manifold, and said means including horizontally disposed vertically spaced tubes closed at one end and connected at their opposite ends to each manifold, vertically spaced shelves within each manifold, flat metal strips secured at the forward ends to said shelves and projecting into the tubes a distance short of the closed ends thereof to provide a lower flow passage and a return flow passage within each tube, said passages being semi-circular in shape, feed flow connections from the reservoir with the lower end of the two outermost manifolds, and return flow connections from the upper end of the two outermost manifolds with the upper end of the reservoir.

PINKNEY P. FRAZER.